United States Patent
Bäversten et al.

[11] Patent Number: 5,898,746
[45] Date of Patent: Apr. 27, 1999

[54] METHOD AND A DEVICE FOR MOVEMENT CORRECTION AND POSITIONING

[75] Inventors: Bengt Bäversten; Karl-Erik Nyström; Anders Rosengren; Antti Suvanto, all of Västerås, Sweden

[73] Assignee: ABB Atom AB, Vasteras, Sweden

[21] Appl. No.: 08/841,401

[22] Filed: Apr. 30, 1997

[30] Foreign Application Priority Data

May 10, 1996 [SE] Sweden .................................. 9601810

[51] Int. Cl.$^6$ .................................................. G21C 19/10
[52] U.S. Cl. ........................ 376/268; 212/273; 294/81.4
[58] Field of Search .................................. 376/264, 268, 376/270, 271; 294/66.1, 81.4; 212/273; 244/30, 92

[56] References Cited

U.S. PATENT DOCUMENTS

| | | | |
|---|---|---|---|
| 2,736,600 | 2/1956 | Carlson | 294/81.4 |
| 3,799,358 | 3/1974 | Putnam | 294/81.4 |
| 3,826,380 | 7/1974 | Lenander et al. | 212/273 |
| 3,971,533 | 7/1976 | Slater | 244/30 |
| 4,180,171 | 12/1979 | Cunningham et al. | 212/273 |
| 4,427,623 | 1/1984 | Howard et al. | 376/271 |
| 4,668,981 | 5/1987 | Egger | 376/248 |
| 4,883,184 | 11/1989 | Albus | 212/274 |
| 5,120,099 | 6/1992 | Fletcher | 294/66.1 |

FOREIGN PATENT DOCUMENTS 1585279 8/1990 U.S.S.R. .............................. 212/273

*Primary Examiner*—Daniel D. Wasil
*Attorney, Agent, or Firm*—Pollock, Vande Sande & Amernick

[57] ABSTRACT

The present invention relates to a method and a device for correction of the movements of a suspension device and positioning thereof in a fluid. The suspension device is provided with a first and a second end, and the first end is suspended from a point (S). A correction device is arranged at the second end of the suspension device and adapted to generate a force which provides an acceleration in the fluid so that the position of the second end of the suspension device is corrected.

10 Claims, 5 Drawing Sheets

METHOD AND A DEVICE FOR MOVEMENT CORRECTION AND POSITIONING

TECHNICAL FIELD

The present invention relates to a method and a device for correction of unwanted movements of a suspended load during its transport thereof in a fluid by means of a transport device, for example a crane or an overhead travelling crane, or the like. Furthermore, the invention relates to a method and to a device for positioning the load when the transport device is not operating.

BACKGROUND OF THE INVENTION

During transport in a fluid, for example water or air, of a load suspended at a point of, for example, a crane, the load may be set in motion in an undesired way, for example during a start-up, a shutdown, a change of course, or an emergency shutdown of the crane. To avoid such unwanted movements, it is common to arrange rigid connections between the load and the crane. Another way of avoiding such unwanted movements is to work with slow acceleration and slow decelerations only. A trained and skilled crane operator may cancel an oscillating movement of the suspended load by achieving an oppositely directed movement with the aid of the crane. However, a mistake may lead to an amplification of the outward swing instead of its weakening thereof, which may cause a fatal result.

Transports of loads suspended from cranes, travelling cranes or the like, occur in many contexts; for example in connection with construction work, harbor work, or mining.

Another problem when working with suspended loads is when positioning them, especially when the load, which is suspended from, for example, a crane, is arranged at a large distance from the point of suspension. During positioning of such a load, it is normal, after the rough positioning, to finely adjust by controlling the crane with small movements to successively transfer the load to the correct position. This fine adjustment requires much experience and high professional skill of the crane operator to achieve the correct position in a relatively short time. If the crane operator lacks this experience and skill, the fine adjustment may be a very time-consuming work.

One specific application where a load is transported suspended with the aid of, for example, a travelling crane is in the shutdown of a nuclear power plant. A shutdown takes place, for example, when service needs to be carried out in the reactor vessel of the nuclear power plant. For this purpose, the reactor vessel is then emptied completely, or partially, of fuel assemblies and/or control rods which are normally arranged therein. The fuel assemblies and/or control rods are then transported between the reactor vessel and a so-called fuel pool where they are to be temporarily stored during the service. A gripping member is then usually arranged so as to be suspended from the travelling crane via a stiff telescopic arm. The gripping member is arranged with the aid of the travelling crane, and the telescopic arm, in position above a fuel assembly or a control rod, whereupon the gripping member is caused to grip the load in question, that is, the fuel assembly or the control rod. The telescopic arm is caused to be retracted whereby the load is then lifted up from the reactor vessel. The load is then transported, raised in this position, to a predetermined position in the fuel pool where, after the correct position has been found, it is lowered down into a so-called fuel rack on the bottom of the fuel pool and is detached from the gripping member.

In this application it is very important that the load is not set in motion in a fuel assembly, which, in the worst case, may result in fissionable material entering the reactor hall of the nuclear power plant.

This handling of fuel assemblies, and/or control rods is a separate operation which takes a relatively large proportion of the total shutdown time. Another time-wasting work operation is the positioning of the gripping member in a position within very close tolerances in order to be able to lift up a fuel assembly or a control rod from the reactor vessel. A corresponding positioning takes place when the load is to be positioned correctly to be able to be moved down into the fuel rack. This fine adjustment is usually done manually by transferring the travelling crane for positioning the gripping member which is arranged at a distance of approximately 10–20 meters from its suspension via the telescopic arm in the travelling crane.

The object of the present invention is to provide a method and a device which allow an accelerated and directionally stable transport with continuous correction of unwanted movements and simplified fine-positioning of suspended loads.

SUMMARY OF THE INVENTION

The present invention relates to a method and to a device for movement correction and positioning of a suspension device for transporting a suspended load. The suspension device is adapted to be movable by means of transport equipment such as a crane or an overhead travelling crane and is adapted to operate in a fluid.

According to one aspect of the invention, the suspension device comprises a first end which is attached to a travelling crane or a crane, or the like, and a second end to which the suspended load can be connected directly or indirectly via, for example, a gripping member. The suspension device comprises a correction device which is adapted to correct unwanted movements of the suspension device and to make possible fine adjustment of the position thereof. The correction device is adapted for this purpose to achieve a force of reaction in the fluid in which it operates, for example a gas such as air or a liquid such as water. Furthermore, the suspension device comprises a first control system which is adapted to make continuous comparative measurements of, for example, angular deformations of the suspension device in relation to a vertical line, and, on the basis of these measurements, to control the correction device so that this device brings about a suitable force of reaction for correction of an unwanted movement and the arrangement of the suspension device such that it is substantially parallel to the vertical line.

The correction device comprises a correction member for generating the force of reaction. The correction member may, for example, consist of one or more rotatable motor-driven propeller devices, or one or more pump-driven nozzles.

Further, the suspension device comprises a second control system for fine adjustment of the position of the second end thereof. The second control system may, for example, comprise a lever in the form of a so-called joystick. The second control system is then adapted, in dependence on the operation of the joystick, to achieve a transfer of the second end of the suspension device. The transfer is indicated in magnitude, position, and direction by the operation of the joystick. Contrary to known fine adjustment systems where the second end of the suspension device is moved by changing the position of its attachment point in the travelling crane, in this case a direct transfer of the second end of the suspension device is achieved by means of the correction device. The advantage of the invention is that a direction-stable and rotation-oriented transport of a suspended load transported in a fluid is achieved by continuously correcting the movement thereof. Another advantage of the invention is that the transport time and the time of positioning are reduced in that the transport can be made at a comparatively higher speed and that the positioning can be made with a comparatively higher precision in a shorter time. Still another advantage is that a considerably simpler transport system can be used. For example, expensive and complicated stiff telescopic arms can be replaced with considerably less expensive and less complicated weak rope arrangements. In particular, the invention permits the handling time of, for example, transfer of a fuel assembly to be significantly reduced whereby the shutdown time of a nuclear reactor can be reduced, which entails a considerable cost saving.

BRIEF DESCRIPTION OF THE DRAWINGS

The invention will be most readily understood with reference to the accompanying drawings, wherein FIG. 1 schematically shows, in a view from the side, a reactor vessel in a reactor pool and an adjacently located fuel pool.

DETAILED DESCRIPTION OF THE PREFERRED EMBODIMENTS

Figure 1:
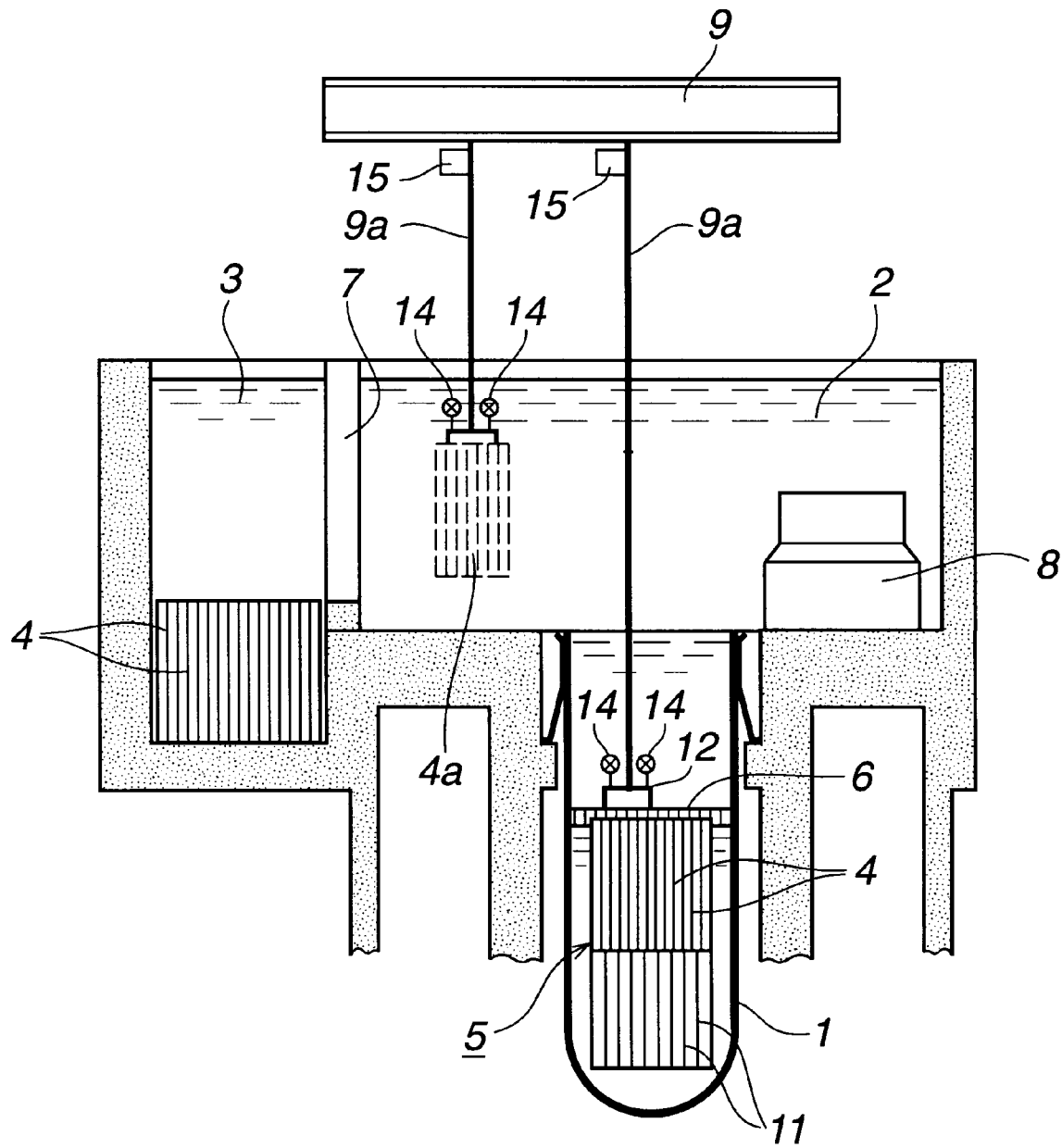

FIG. 1 shows part of a nuclear power plant comprising a reactor vessel 1 with a removed reactor vessel cover, not shown in the figure, arranged in a water-filled reactor pool 2. Further, a so-called fuel pool 3 is shown arranged adjacent to the reactor pool 2. The fuel pool 3 is substantially designed for temporary storage of new and completely or partially burnt-up fuel assemblies 4, respectively. The reactor vessel 1 comprises a core 5 with a plurality of fuel assemblies 4 and a core grid 6 arranged above the core 5. The reactor pool 2 is connected to the fuel pool 3 via a closable opening 7. The other internal parts 8 of the reactor can be temporarily arranged in the reactor pool 2.

A gripping member 12 is suspended from a travelling crane 9, or a similar device, in the reactor hall. The gripping member 12 is rigidly or flexibly connected to the travelling crane 9 via a suspension device 9a. The gripping member 12 is lowered into the reactor vessel 1 for gripping a load 4a; for example one or more fuel assemblies 4 and/or control rods 11 or a tool and for raising thereof. In the raised position the load 4a is then transported to a position, for example in the fuel pool 3, where it is to be lowered for temporary storage (see dashed lines in FIG. 1).

Figure 2A:
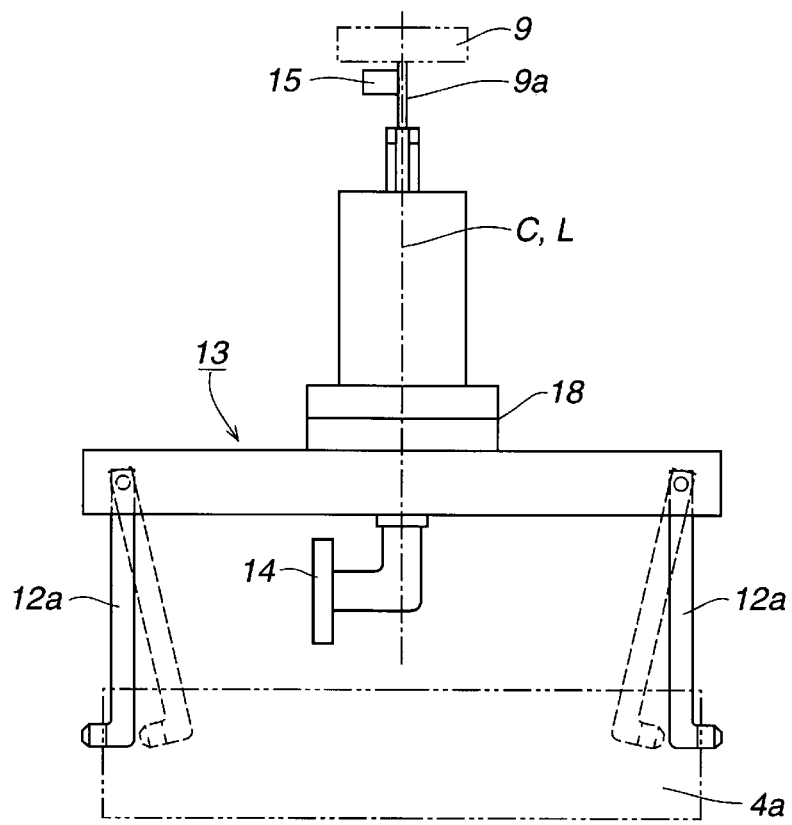
FIGS. 2a, 2b and 2c show in various sections a suspension device with a correction device comprising one correction member.
Figure 2B:
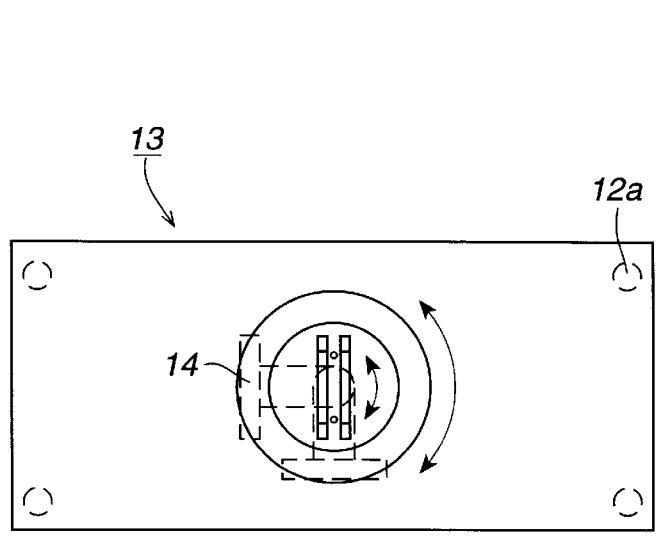
Figure 2C:
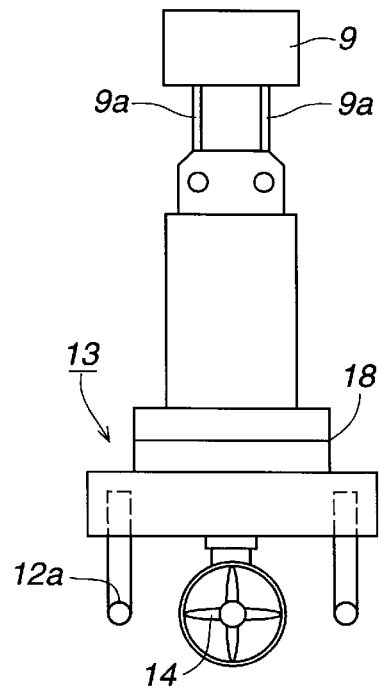

FIGS. 2a–2c show a travelling crane 9 which supports a suspension device 9a. The suspension device 9a is provided with a first and a second end. The first end is attached to the travelling crane and the second end is freely suspended. To the second end of the suspension device 9a there may be, directly or indirectly, connected a load 4a. A correction device 13 is associated with the second end of the suspension device 9a. Associated with the correction device 13 is a motor-driven propeller device 14 which is rotatable through 360°. An angle measuring instrument 15 is arranged at the first end of the suspension device 9a for measuring angular deviations in the lateral direction $\phi$ and in the vertical direction $\beta$ of a center axis C thereof in relation to a plane P which is arranged perpendicular to the center axis C.

When the suspension device 9a is set into motion with the aid of the travelling crane 9, its center line C will deviate from a vertical line L. The correction device 13 is arranged to be rotatable by means of a correction member around the center axis C of the suspension device 9a (see reference numeral 18) and may be influenced by means of a control system for generating a force for transfer to a desired position of the second end of the suspension device 9a. This desired position may, for example, mean that the center line C is to coincide with the vertical line L and that the resultant rotation shall be zero, that is $\phi=0$.

Figure 3A:
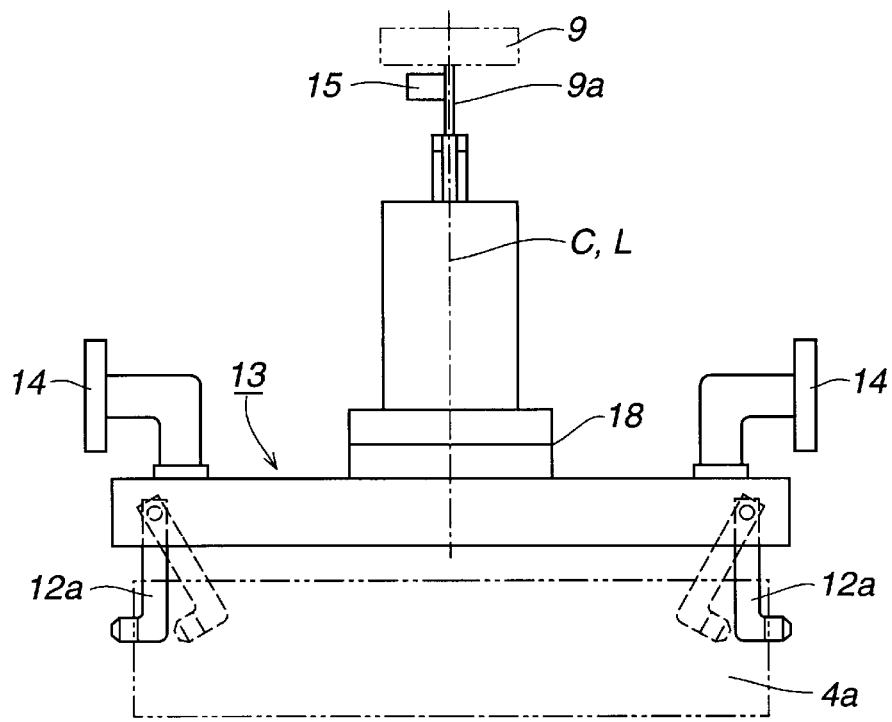
FIGS. 3a, 3b, and 3c show in various sections a suspension device with a correction device comprising three correction members.
Figure 3B:
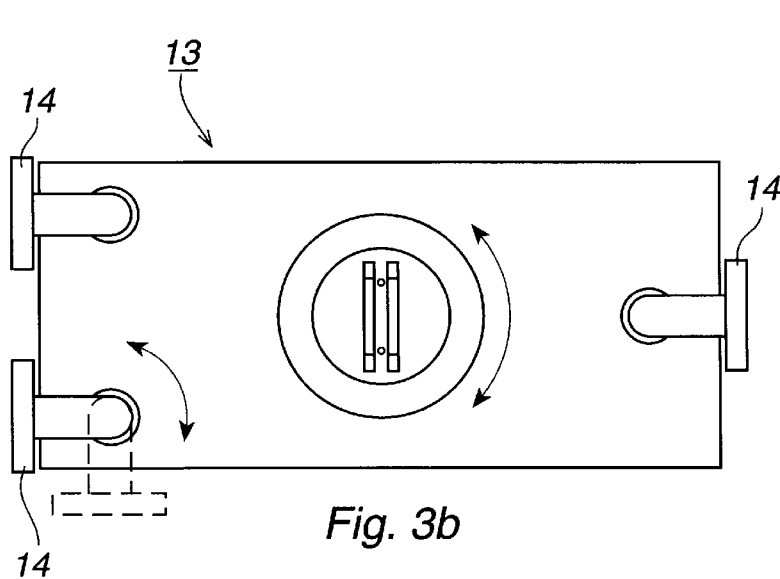
Figure 3C:
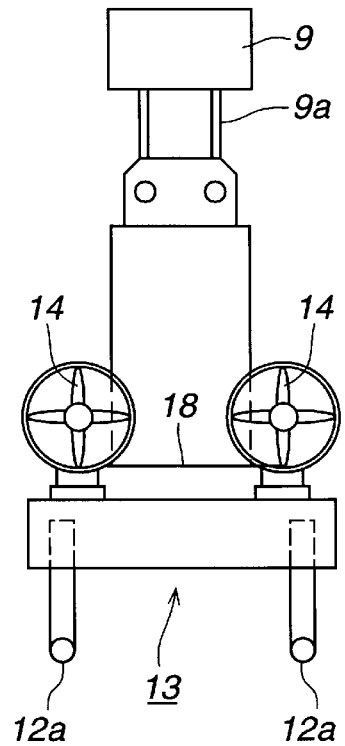

FIGS. 3a–3c show a correction device 13 comprising three propeller means 14, each arranged individually controllable and rotatable up to 360°.

Figure 4A:
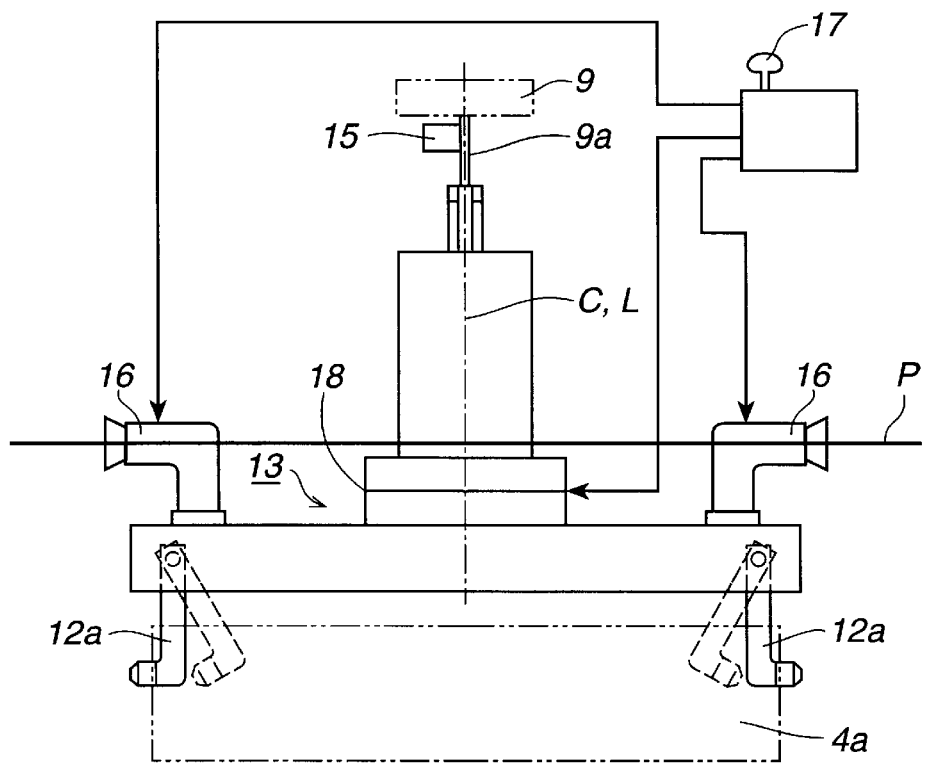
FIGS. 4a, 4b, and 4c show in various sections a suspension device with a correction device comprising three correction members.
Figure 4B:
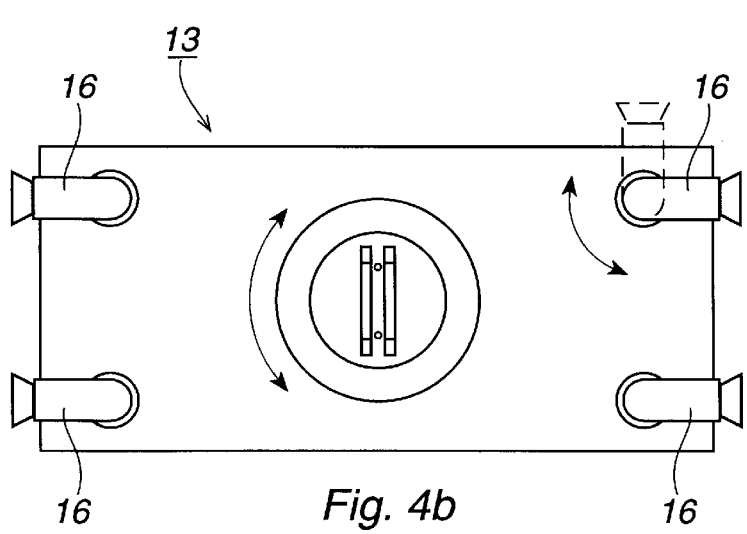
Figure 4C:
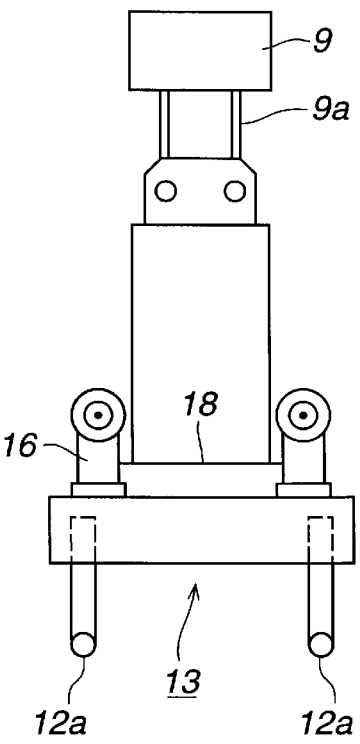

FIGS. 4a–4c show a correction device 13 which comprises four nozzle means 16, each arranged individually controllable and rotatable up to 360°. The nozzle means 16 may be adapted by means of pumps to generate pressure shocks in dependence on the movement to be corrected.

The travelling crane 9 in FIG. 4a thus supports the suspension device 9a, to the second end of which there are connected four grippers 12a and the correction device 13. The suspension device 9a is attached to the travelling crane 9 at the point S and is transferable with the aid of the travelling crane 9.

The correction device 13 has two functions, namely, to correct oscillating movements of the suspension device 9a and the load 4a, substantially rigidly connected thereto, which arise during transfer of the suspension device 9a, and to position the suspension device 9a, and hence the load 4a, when the travelling crane 9 is not operating. Thus, the correction device 13 is to be able to carry out rotation and transfer of the second end of the suspension device 9a to a desired position.

The suspension device 9a in FIG. 4a comprises four nozzle means 16 arranged in a plane P (see FIG. 4a) perpendicular to the center axis C of the suspension device 9a. The nozzle means 16 are adapted so that the acceleration of the load 4a may be chosen freely with respect to both magnitude and direction in the plane P. The nozzle means 16bare to be capable of being influenced via a first and a second control system. The task of the first control system is to optimize the movements of the suspension device 9a in relation to the vertical line L during the transport. The first control system comprises the above-mentioned angle sensor 15 which, more particularly, is adapted to measure an angle between the vertical line L and the longitudinal axis C of the suspension device 9, both in the lateral direction, the angle $\phi$, and in the vertical direction, the angle $\beta$. The angle sensor 15 may be either analog or digital.

Figure 5:
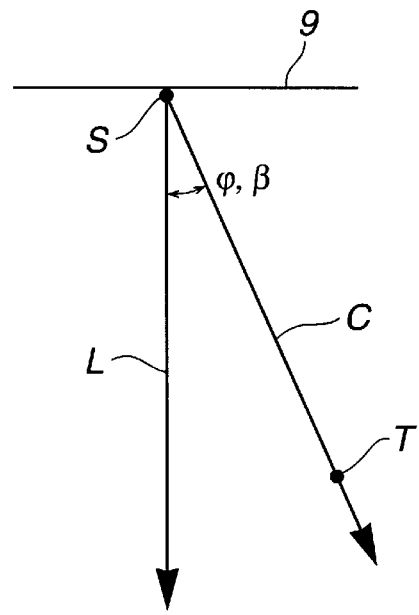
FIG. 5 schematically shows an oscillating movement in a suspension device suspended from a transport device, and FIG. 6 schematically shows a control system for a correction device.
Figure 6:
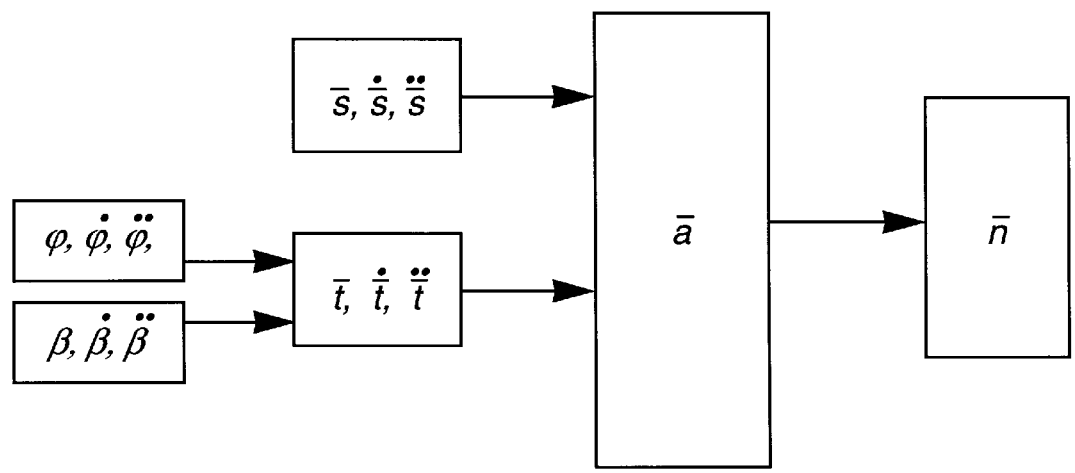

FIG. 5 shows a schematic picture of the suspension device 9a with a center line C during an oscillating movement in relation to the vertical line L. FIG. 6 shows an example of a model of the first control system for correction of the oscillating movement in FIG. 5. The position, velocity and acceleration $\bar{s}, \bar{\bar{s}}, \bar{\bar{\bar{s}}}$ at the suspension point S of the suspension device 9a in the travelling crane 9 are known. The angles φ and β, respectively, between the vertical line L and the center axis C of the suspension device 9a are obtained from the angle sensor 15. The point T in FIG. 5 constitutes the intersection between the center axis C of the suspension device and the plane P. The plane P is suitably arranged through the center of the correction member 16. Based on the angles φ and β and the distance between the points S and T which is known, the position, velocity and the acceleration $\bar{t}, \bar{\bar{t}}, \bar{\bar{\bar{t}}}$ of the point T are calculated. With knowledge of how the nozzle means 16 influence the acceleration of the second end of the suspension device 9a, a model is set up, for example according to FIG. 6. Based on the position, the velocity and the acceleration $\bar{s}, \bar{\bar{s}}, \bar{\bar{\bar{s}}}$ at the suspension point S and the position, the velocity and the acceleration $\bar{t}, \bar{\bar{t}}, \bar{\bar{\bar{t}}}$ at the point T, the direction and the magnitude of the desired acceleration $\bar{a}$ of the correction device 13 are calculated, and based on these values and the model set up, the speed vector $\bar{n}$, consisting of the speed of each one of the speed-controlled pumps or motors controlling the nozzle means, is calculated. In the model, other known data during the transport can also be taken into consideration, such as how long a distance the load 4a is to be transported and what speed is the most suitable for each section of this distance.

During fine adjustment of the second end of the suspension device 9a when the travelling crane 9 is not operating, a second control system is arranged comprising a joystick 17 (see FIG. 4a). The second control system is adapted, in dependence on the operation of the joystick 17, to bring about transfer of the second end of the suspension device 9a. The position and the direction of the transfer is indicated by the operation of the joystick 17. The transfer is achieved by the correction members 14, 16 of the correction device 13 individually controllable via signals generated in the second control system. As mentioned above, the correction device 13 is rotatable in relation to the suspension device 9a (see reference numeral 18 in FIG. 4a). The joystick 17 is thus adapted to directly control the second end of the suspension device 9a so that the desired position thereof is obtained.

We claim:

1. A method for correction of movement of a suspension device used for moving fuel assemblies or control rods under a liquid between a reactor vessel and a fuel pool, wherein said suspension device is provided with first and second ends, said first end being suspended from a travelling crane at a connecting point, said method comprising the steps of:

attaching a correction device to said second end;
   lifting at least one of a fuel assembly and a control rod with said suspension device;
   moving said suspension device between said fuel pool and said reactor vessel;
   measuring the angular deformation of said suspension device in the lateral and vertical directions during said moving with an angle measuring device;
   measuring the position of said connection point;
   determining a correction force from the measured values;
   applying said correction force via correction members to said correction device such that oscillating movements of said suspension device are corrected;
   stopping said suspension device in a predetermined position; and
   finely positioning said suspension device with said correction members based on control signals from a second control system.

2. The method of claim 1 wherein said second control system comprises a joystick.

3. An apparatus for transporting suspended loads between a reactor vessel and a fuel pool, said apparatus comprising:
   a travelling crane;
   a suspension device having a first end attached to said travelling crane;
   a correction device attached to a second end of said suspension device;
   a correction member for generating a force of reaction in a liquid;
   a first control system for automatically controlling said correction members to correct oscillating movements of said suspension device during movement of said travelling crane; and
   a second control system for controlling said correction members to finely position said second end of said suspension device when said travelling crane is stopped.

4. The apparatus of claim 3 wherein said correction device is rotatably attached to said suspension device whereby said correction device rotates about a center axis of said suspension device by means of said correction members.

5. The apparatus of claim 3 wherein said first control system comprises an angle measuring device for measuring an angular deviation of said suspension device in a lateral direction and in a vertical direction.

6. The apparatus of claim 3 wherein at least one correction member is a propeller device.

7. The apparatus of claim 3 wherein at least one correction member is a nozzle.

8. The apparatus of claim 3 wherein said correction members are independently controllable.

9. The apparatus of claim 3 wherein said correction member is rotatable through 360 degrees with respect to said correction device.

10. A method for correction of movement of a suspension device used for moving fuel assemblies or control rods under a liquid between a reactor vessel and a fuel pool, wherein said suspension device is provided with first and second ends, said first end being suspended from a travelling crane and a correction device connected to said second end, said method comprising the steps of:
    lifting at least one of a fuel assembly and a control rod;
    moving said suspension device between said fuel pool and reactor vessel;
    determining oscillating movements of said suspension device with a first control system;
    correcting said oscillating movements with correction members associated with said correction device and controlled by said first control system;
    stopping said suspension device in a predetermined position; and
    finely positioning said suspension device with a second control system which controls said correction members.

* * * * *